(12) United States Patent
Kim et al.

(10) Patent No.: US 9,100,140 B2
(45) Date of Patent: Aug. 4, 2015

(54) SPREADING CODE PRODUCING APPARATUS

(75) Inventors: Youn-Tae Kim, Yuseong-gu (KR);
Kun-Ho Park, Goheung-gun (KR);
Jang-Myoung Kim, Seo-gu (KR);
Min-Joo Jeong, Dong-gu (KR);
Chang-Hee Hyoung, Yuseong-gu (KR);
Jung-Hwan Hwang, Yuseong-gu (KR);
Sung-Weon Kang, Yuseong-gu (KR)

(73) Assignee: INDUSTRY-ACADEMIC COOPERATION FOUNDATION, CHOSUN UNIVERSITY, Gwangju (KR)

( * ) Notice: Subject to any disclaimer, the term of this patent is extended or adjusted under 35 U.S.C. 154(b) by 0 days.

(21) Appl. No.: 13/463,013

(22) Filed: May 3, 2012

(65) Prior Publication Data

US 2013/0279542 A1    Oct. 24, 2013

(30) Foreign Application Priority Data

Apr. 20, 2012 (KR) ........................ 10-2012-0041460

(51) Int. Cl.
*H04B 1/00* (2006.01)
*H04B 7/216* (2006.01)
*H04J 13/10* (2011.01)
*H04J 3/10* (2006.01)
*H04J 11/00* (2006.01)

(52) U.S. Cl.
CPC . *H04J 13/10* (2013.01); *H04J 3/10* (2013.01); *H04J 11/00* (2013.01)

(58) Field of Classification Search
CPC ... H04J 13/0022; H04J 11/00; H04J 13/0059; H04J 3/10
USPC .................... 375/130, 150; 370/342
See application file for complete search history.

(56) References Cited

U.S. PATENT DOCUMENTS

| | | | | |
|---|---|---|---|---|
| 5,956,328 | A * | 9/1999 | Sato | 370/335 |
| 6,282,181 | B1 * | 8/2001 | Stark et al. | 370/335 |
| 6,289,228 | B1 * | 9/2001 | Rotstein et al. | 455/574 |
| 2001/0011954 | A1 * | 8/2001 | Shelton et al. | 340/825.49 |
| 2001/0033559 | A1 * | 10/2001 | Masui et al. | 370/335 |
| 2002/0021686 | A1 * | 2/2002 | Ozluturk et al. | 370/342 |
| 2002/0037030 | A1 * | 3/2002 | Goto | 375/152 |
| 2003/0067904 | A1 * | 4/2003 | Nagatani et al. | 370/342 |
| 2003/0095529 | A1 * | 5/2003 | Petre et al. | 370/342 |
| 2006/0098721 | A1 * | 5/2006 | Rabaeijs et al. | 375/150 |
| 2007/0133659 | A1 * | 6/2007 | Deng et al. | 375/144 |

* cited by examiner

*Primary Examiner* — Chieh M Fan
*Assistant Examiner* — Sarah Hassan
(74) *Attorney, Agent, or Firm* — Porzio, Bromberg & Newman, P.C.

(57) ABSTRACT

This invention relates to spreading code producing apparatus, which comprises: two phase shifters for spreading code which receive bits for determining spreading codes and phase information and producing spreading codes; and multiplexers which receive two spreading codes produced said two phase shifters for spreading code, receive bits through separate way which defines outputting order of the received two spreading codes and produce spreading codes with same length as said received two spreading codes. Therefore, many information using few spreading codes can be transmitted so that data transmission rate can be raised. Furthermore, communication service with high speed can be performed among communication devices using human body communication etc.

10 Claims, 3 Drawing Sheets

SPREADING CODE PRODUCING APPARATUS

CROSS-REFERENCE TO RELATED APPLICATION

This application claims priority on 10-2012-0041460 filed in Korea on Apr. 20, 2012, the entirety of which is hereby incorporated by reference into this application.

FIELD OF THE INVENTION

This invention relates to spreading code producing apparatus, especially spreading code producing apparatus where spreading codes are shorten and combined through a plurality of spreaders so as to raise data transmission rate when data are modulated for transmission of data.

That is, this invention is about a modulation device for communication system which modulate data using a plurality of spreaders three channels in order that data transmission rate be raised in communication using spreading code. This invention may be applied to communication technique of high speed using spreading codes including human body communication.

This invention has been issued from research performed as one event among growth driving events with new technique mixing type under an administrator of human recognition circumstance works in an education and science technique ministry, which has a bibliographic data of [project management number of 2011K000662, project title of human body communication with high speed or power transmission technique using human body medium].

DESCRIPTION OF THE PRIOR ART

Conventional spreading method where was applied to technique for raising transmission speed of information using a plurality of spreading codes was used at mobile devices such as personal portable communication device or body and near distance communication. Even if magnitude of signals were very weak, communication could be performed and be strong against noise signals in this conventional method using spreading codes. However, there was a problem of low transmission rate than other several transmission method in this conventional method using spreading codes.

First prior document is Korean patent registration Number KR0994982 with Registration date of Nov. 11, 2010 and Assignee name of Electronics and Telecommunications Research Institute, hereafter called as ETRI. Detailed composition is showed in the KR0994982. However, there is a difficulty about controlling transmission rate of output signals according to a plurality of clock frequencies in a system since entire composition of phase modulation is not shown in the KR0994982.

Second prior document is Korean patent registration Number KR0173101 with Registration date of Oct. 27, 1998 and Assignee name ETRI. The KR0173101 shows composition for Walsh code producing. However there is other difficulty in the KR0173101 that communication network cannot be formed quickly in short distance communication such as human body communication since entire composition of phase modulation is also not given in the KR0173101.

SUMMARY OF THE INVENTION

To solve above difficulties, it is an object of the present invention to provide spreading code producing apparatus which raises data transmission rate and remains orthogonality in result of transferring many number of information using spreading code.

In accordance with an embodiment of an aspect of the present invention, there is provided an spreading code producing comprising: serial-to-parallel converters for converting input signals with multi bit inputted serially to parallel signals; spreaders for combining bit signals including phase modulation information from said serial-to-parallel converters to select a spreading code; multiplexers for stringing multi spreading code produced from said multi spreaders and specific spreading codes produced from serial-to-parallel converters in order in accordance with order definition signals from said serial-to-parallel converters to produce stringed multi spreading codes; and bit selectors for selecting a spreading code among said multi spreading codes from said multiplexers alternatively to producing the selected spreading code.

Phase shifters are connected between said spreaders and multiplexers so that the phase shifters generate symbols SG1~SG6 with spreading codes produced said spreaders. The phase shifter may comprise for example, an exclusive OR gate XOR.

Length of spreading codes as input signals inputted to said multiplexers and majority bit selector may be same as length of a spreading code produced from said majority bit selector.

Said multiplexers may produce first a half of a spreading code between two spreading codes and produce later a remnant half of the spreading code code according to order definition signals produced from said serial-to-parallel converters in order that length of input signals and output signals in multiplexers should be same.

While, Spreading codes produced from said spreaders may be orthogonality.

While, transmittance rate of phase modulation signals which are inputted to the spreaders and are produced from the majority bit selector, may be increased proportionally in accordance with increasing of clock frequencies of the spreaders and the multiplexers.

Effect of the spreading codes producing apparatus in accordance with the present invention will be described as following.

There is effect that many information using spreading codes with small number can be transmitted so that data transmission rate can be raised. Orthogonality of signals can be remained in result that said many information using spreading codes with small number can be transmitted.

Since spreading codes are created through a plurality of sub-channels and spreaders, data can be modulated in high speed. As these phase modulators of the present invention can modulate in high speed, the phase modulators can be used in communication system which needs data transmission with high speed.

Since higher data is modulated using spreading codes with small number in near distance communication between two adjacent devices using communication channel of broadband, high transmission rate of data can be obtained.

Two spreading codes inputted said multiplexers have orthogonality each other so that orthogonality between the spreading codes can be remained even if a half of a spreading code is used.

The Orthogonality can be remained even if phases are reversed. Therefore codes can be separated from receiver even if phases are reversed and half of two spreading code groups are combined to make a symbol.

In phase modulation process and passing process through multiplexer, change of length do not occur so that transmission rate of chips do not occur. When a symbol S1, S2, S3 producing from the multiplexers use 64M clock and spreading coefficient is 64 through such processes, transmission rate of 64M cps is performed. "M cps" means "Mega chips per second". In case of using 64M clock, one chip can be represented with one period of a clock and maximum of 9 M bps can be transmitted on one channel. "M bps" means "Mega bits per second". Transmission rate of output signal produced from majority bit selector is proportionally increased to clock frequency of a transmitter so that transmission rate of phase modulating device can be controlled easily.

Furthermore, data can be modulated with high speed in result that spreading codes generate through a plurality of sub-channels and spreaders. Phase modulator according to this invention can be used in communication system which need transmission of high speed since the phase modulator can modulate data with high speed.

Spreading code selection bits produced from one serial-to-parallel converters are divided into directions of two spreaders and output signals of the spreaders are received at phase shifters, so that order of the spreading codes are aligned by control signals. Therefore many information can be transmitted and transmission rate can be raised even if length of spreading codes are not extended.

While, the spreading codes produced from one serial-to-parallel converter 4, 6, 8 are divided with two parts and are received at two spreaders 12, 14, 32, 34, 52, 54. Then the order of the spreading code groups WG1, WG2, WG3, WG4, WG5, WG6 produced from the two spreaders 12, 14, 32, 34, 52, 54 is aligned by control signals. Therefore, a lot of information can be transmitted and transmission rate can be raised even if length of spreading codes are not extended.

Three channels including channel 1, channel 2 and channel 3 are arranged parallel and output symbols of these three channels are at the majority bit selector, so that a symbol with majority bits among the three symbols are produced from the majority bit selector. So, many information can be transmitted even if length of spreading codes are not extended.

Modulation method of this invention can raise capability of wireless communication and wire communication with limited band width, which are using spreading codes. Therefore, it can be applied to field with large market share including mobile devices such as personal portable communication devices or body and near field communication. Furthermore, this technique using spreading codes can be applied to transmitters using limited spreading codes in order that data with higher speed should be transmitted. The technique can be also applied to any technical field including wire and wireless area which needs transmittance rate with high speed.

BRIEF DESCRIPTION OF THE DRAWINGS

The above and other objects and features of the this invention will become apparent from the following description of preferred embodiments taken in conjunction with the accompanying drawings and tables, in which.

While, Table 1 is an table shown mutual relationship between Walsh codes W00~W47 and Walsh code groups WG1~WG6 which are as spreading signals which are selected and generated at spreaders after receiving input bits b11~b16, b21~b26, b31~b36.

Table 2 shows code composition examples of symbols SG1a, SG1b, SG2a, SG2b and Walsh codes WG1a, WG1a, WG1b, WG1b, WG2a, WG2a, WG2b, WG2b generated by input signals c11~c13 as control signals produced from serial-to-parallel converters;

Table 3 shows composition examples of symbols SG1, SG2 generated by the Walsh code W00 and Walsh code W08 as two spreading signals;

Table 4 is a truth table among input signals S1, S2, S3 and output signals of a majority bit selector.

DETAILED DESCRIPTION OF THE INVENTION

Figure 1:
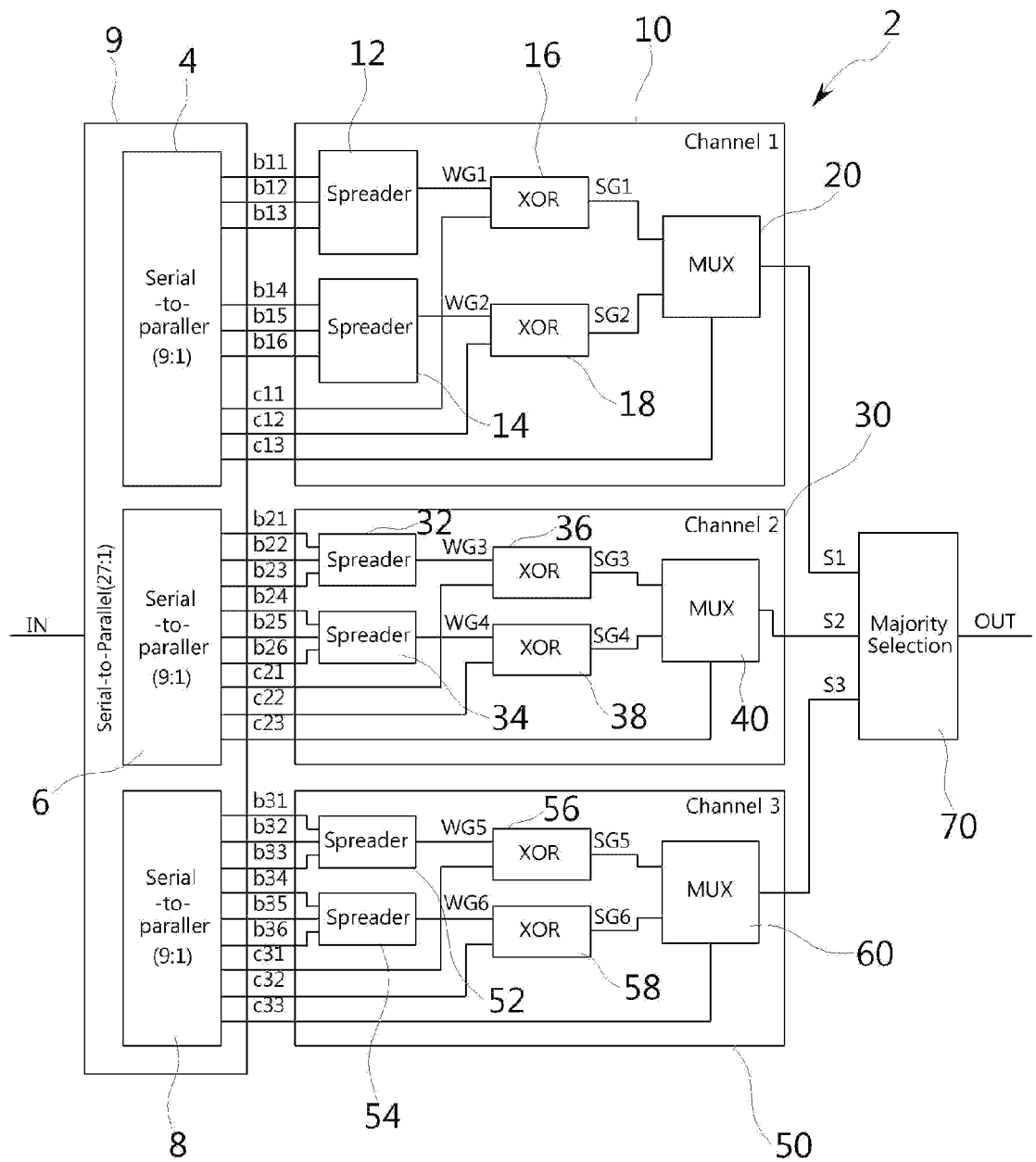
FIG. 1 is an entire block diagram of a modulator according to an embodiment of this invention.
Figure 2:
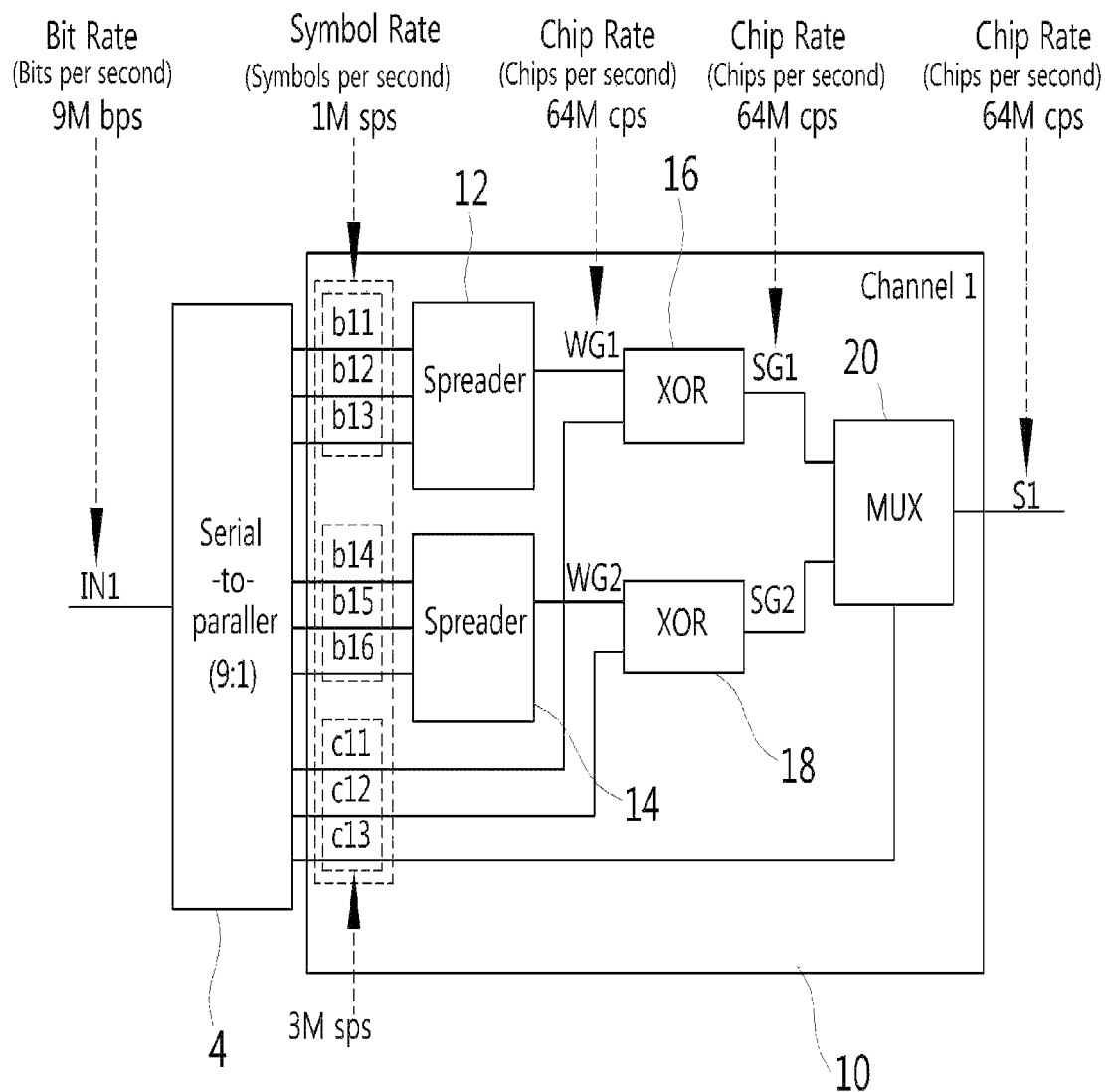
FIG. 2 is an enlarged composition diagram of channel 1 at the modulator of FIG. 1.

As described in FIG. 1 and FIG. 2, spreading code producing device 2 according to first embodiment of this invention comprises serial-to-parallel converters 4, 6, 8, spreaders 12, 14, 32, 34, 52, 54, phase shifters 16, 18, 36, 38, 56, 58, multiplexers 20, 40, 60 and majority bit selector 70. In first embodiment of this invention, a majority bit selector 70 connected to 3 channels 10, 30, 50 in order to receive symbols from 3 multiplexers 20, 40, 60. One of serial-to-parallel converters 4, 6, 8 and two spreaders 12, 14, 32, 34, 52, 54, two phase shifters 16, 18, 36, 38, 56, 58 and one of multiplexers 20, 40, 60 constitute one channel so that input signals inputted to the spreading code producing device 2 are dispersed into the 3 channels 10, 30, 50.

A serial-to-parallel converter 4, 6, 8 per one channel 10, 30, 50 is arranged in order to convert in parallel input signal of multi-bit inputted serially. Two spreaders 12, 24, 32, 34, 52, 54 per one channel 10, 30, 50 combine bit signals produced from said serial-to-parallel converter 4, 6, 8 and select spreading codes. The spreading codes are inputted to the multiplexers 20, 40, 60 through phase shifters 16, 18, 36, 38, 56, 58 which modulate phase of spreading codes selected using phase control bit. The two spreading codes passed through said phase modulator remain respectively orthogonality between a half of a spreading code and later a remnant half of the spreading code, and they are inputted to multiplexers 20, 40, 60.

In drawings of this invention, signals WG1~WG6 produced from spreaders 12, 14, 32, 34, 52, 54 are inputted to multiplexers MUX 20, 40, 60 through phase shifters 16, 18, 36, 38, 56, 58. The phase shifters 16, 18, 36, 38, 56, 58 perform function reversing phase of spreading codes inputted to the phase shifters 16, 18, 36, 38, 56, 58. The phase reverse is controlled by control signals Cx1, Cx2, where x=1, 2, 3, produced from serial-to-parallel converters 4, 6, 8. The phase shifters 16, 18, 36, 38, 56, 58 can comprise easily XOR and the phase shifters 16, 18, 36, 38, 56, 58 performing phase reversing function will be showed as XOR hereinafter.

In two phase shifters 16, 18, 36, 38, 56, 58 per one channel 10, 30, 50, one spreader 12, 14, 32, 34, 52, 54 is connected to the one phase shifter 16, 18, 36, 38, 56, 58 per one channel 10, 30, 50 so that aligned symbol SG1~SG6 is produced. The one phase shifter 16, 18, 36, 38, 56, 58 reverses phase of spreading code and align the reversed spreading code according to a command included in a control signal. Said phase shifter 16, 18, 36, 38, 56, 58 comprises the Exclusive OR gate XOR in order that the spreading codes inputted to phase shifters 16, 18, 36, 38, 56, 58 are aligned in order and are modulated in phase.

The multiplexers 20, 40, 60 are connected to said two phase shifter 16, 18, 36, 38, 56, 58 so that symbols SG1, SG2, SG3, SG4, SG5, SG6 inputted from the two phase shifter 16, 18, 36, 38, 56, 58 are produced in order according to control signals produced from said serial-to-parallel converters 4, 6, 8. In this case, said multiplexers 20, 40, 60 are connected to said shifter 16, 18, 36, 38, 56, 58 in order that multiplexers 20, 40, 60 produce first a half of a spreading code inputted to multiplexers 20, 40, 60 and produce later a remained half of the spreading code in purpose that an input signal and an out signal of multiplexers 20, 40, 60 have same length.

The majority bit selector 70 is connected to the multiplexes 20, 40, 60 of respective channels 20, 40, 60 so that the majority bit selector 70 receives a plurality of phase-modulated spreading codes S1~S3 produced from the multiplexes 20, 40, 60 of respective channels 20, 40, 60 and produces one chip with majority bit among three chips of the phase-reversed spreading codes S1~S3 which are produced from the multiplexes 20, 40, 60 and are at same time range. In this case, all of spreading codes S1~S3 which are produced from the multiplexes 20, 40, 60 and inputted to the majority selector 70 are not modulated in phase. The all of spreading codes S1~S3 comprises a part of spreading codes S1~S3 reversed in phase according to the control signals from the serial-to-parallel converters 4, 6, 8 and other part of spreading codes S1~S3.

In this case, the majority bit selector 70 is connected to the multiplexers 20, 40, 60 in order that length of spreading codes as input signals inputted to the multiplexes 20, 40, 60 and the majority bit selector 70 are same as length of spreading codes as output signals produced from the multiplexes 20, 40, 60 and the majority bit selector 70.

Connection structure between the majority bit selector 70 and respective channels 10, 30, 50 is described in FIG. 1 and the channels 10, 30, 50 are connected to one another with parallel. The majority bit selector 70 connected to the channels 10, 30, 50 in order that combines the out symbols S1, S2, S3 according to a truth table of Table 4 and produce an output symbol.

Operation of spreading code device apparatus according to first embodiment of this invention will be described hereinafter. In order to describe simply, description of operation will be about channel 1 10 mainly, and repeated description will be abbreviated about channel 2 30 and channel 3 50 since same or similar operations will be repeated.

As described in FIG. 1 and FIG. 2, input signal with 27 bits is inputted a serial-to-parallel converting means 9. 27 bits is divided into 3 parts with 9 bits and respective parts with 9 bits are inputted to the serial-to-parallel converters 4, the serial-to-parallel converters 6 and the serial-to-parallel converters 8 of the serial-to-parallel converting means 9. Then six bits b11, b12, b13, b14, b15, b16 among the 9 bits are produced to the spreader 12 and the spreader 14 from the serial-to-parallel converters 4 connected to channel 1 10, and remained 3 bits c11, c12, c13 are produced to the phase shifter 16, the phase shifter 18 and the multiplexer 20 as control signals.

As shown in Table 1, the spreaders 12, 14 created spreading codes using combination of inputted bits b11~b16, b21~b26, b31~b36. 3 bit signals (b11, b12, b13)(b14, b15, b16)(b21, b22, b23)(b24, b25, b26)(b31, b32, b33)(b34, b35, b36) are inputted respectively to 2 spreaders per respective channels 10, 30, 50. Respective spreaders 12, 14, 32, 34, 52, 54 combine the inputted 3 bit signals and perform mapping process about combined signals. Then Spreading code groups WG1, WG2, WG3, WG4, WG5, WG6 which comprise Walsh code groups are created in the respective spreaders 12, 14, 32, 34, 52, 54, and the spreading code groups WG1, WG2, WG3, WG4, WG5, WG6 are produced to the phase shifter. That is, bits b11~b13 inputted to the spreader 12 are processed through mapping process and a code among 8 spreading codes W00, W01, W02, W03, W04, W05, W06, W07 which are constituted to a spreading code groups WG1 of a Walsh code group are created. While, bits b14, b15, b16 inputted to another spreader 14 are processed through mapping process and 8 spreading codes W08~W15 which are constituted to a spreading code groups WG2 of a Walsh code group are created.

As shown in Table 1, total 6 of respective spreading code groups WG1, WG2, WG3, WG4, WG5, WG6 comprise 8 spreading codes (W00, W01, W02, W03, W04, W05, W06, W07)(W08, W09, W10, W11, W12, W13, W14, W15)(W16, W17, W18, W19, W20, W21, W22, W23)(W24, W25, W26, W27, W28, W29, W30, W31)(W32, W33, W34, W35, W36, W37, W38, W39)(W40, W41, W42, W43, W44, W45, W46, W47) per one spreading code group WG1, WG2, WG3, WG4, WG5, WG6 and respective spreading codes are Walsh codes. In this case, transmission rate of input signal (IN) inputted the serial-to-parallel converters 4, 6, 8 is for example, 9 Mbps and respective signals with 1 bit inputted to the spreaders 12, 14, 32, 34, 52, 54 from the serial-to-parallel converters 4, 6, 8 have transmission rate of 1 Msps. The 'Mbps' means 'Mega Bit per Second' and the 'Msps' means 'Mega Symbols per Second'.

TABLE 1

| Input Data | | | Walsh Code | Walsh Code | Input Data | | | Walsh Code | Walsh Code |
|---|---|---|---|---|---|---|---|---|---|
| b11 | b12 | b13 | | | b14 | b15 | b16 | | |
| 0 | 0 | 0 | W00 | WG1 | 0 | 0 | 0 | W08 | WG2 |
| 0 | 0 | 1 | W01 | | 0 | 0 | 1 | W09 | |
| 0 | 1 | 0 | W02 | | 0 | 1 | 0 | W10 | |
| 0 | 1 | 1 | W03 | | 0 | 1 | 1 | W11 | |
| 1 | 0 | 0 | W04 | | 1 | 0 | 0 | W12 | |
| 1 | 0 | 1 | W05 | | 1 | 0 | 1 | W13 | |
| 1 | 1 | 0 | W06 | | 1 | 1 | 0 | W14 | |
| 1 | 1 | 1 | W07 | | 1 | 1 | 1 | W15 | |

| Input Data | | | Walsh Code | Walsh Code Group | Input Data | | | Walsh Code | Walsh Code Group |
|---|---|---|---|---|---|---|---|---|---|
| b21 | b22 | b23 | | | b24 | b25 | b26 | | |
| 0 | 0 | 0 | W16 | WG3 | 0 | 0 | 0 | W24 | WG4 |
| 0 | 0 | 1 | W17 | | 0 | 0 | 1 | W25 | |
| 0 | 1 | 0 | W18 | | 0 | 1 | 0 | W26 | |
| 0 | 1 | 1 | W19 | | 0 | 1 | 1 | W27 | |
| 1 | 0 | 0 | W20 | | 1 | 0 | 0 | W28 | |
| 1 | 0 | 1 | W21 | | 1 | 0 | 1 | W29 | |
| 1 | 1 | 0 | W22 | | 1 | 1 | 0 | W30 | |
| 1 | 1 | 1 | W23 | | 1 | 1 | 1 | W31 | |

| Input Data | | | Walsh Code | Walsh Code Group | Input Data | | | Walsh Code | Walsh Code Group |
|---|---|---|---|---|---|---|---|---|---|
| b31 | b32 | b33 | | | b34 | b35 | b36 | | |
| 0 | 0 | 0 | W32 | WG5 | 0 | 0 | 0 | W40 | WG6 |
| 0 | 0 | 1 | W33 | | 0 | 0 | 1 | W41 | |
| 0 | 1 | 0 | W34 | | 0 | 1 | 0 | W42 | |
| 0 | 1 | 1 | W35 | | 0 | 1 | 1 | W43 | |
| 1 | 0 | 0 | W36 | | 1 | 0 | 0 | W44 | |
| 1 | 0 | 1 | W37 | | 1 | 0 | 1 | W45 | |
| 1 | 1 | 0 | W38 | | 1 | 1 | 0 | W46 | |
| 1 | 1 | 1 | W39 | | 1 | 1 | 1 | W47 | |

Then, two phase shifter 16, 18 at the channel 1 10 receive respective spreading code groups WG1, WG2, where transmission rate of spreading code groups WG1, WG2 transmitted to the phase shifters 16, 18 from the spreaders 12, 14 have 64 M cps. The 'Mcps' means 'Mega Chip per Second'.

Then the phase shifter 16, 18 modulate phases of the spreading codes (W00, W01, W02, W03, W04, W05, W06, W07), (W08, W09, W10, W11, W12, W13, W14, W15) of the spreading code groups WG1, WG2, according to control signals c11, c12 which are received separately from the serial-to-parallel converter 4. Then, spreading codes SG1, SG2 which are modulated in phases are produced from the phase shifter 16, 18 to the multiplexer 20.

Since just 48 spreading codes among total 64 spreading codes are used In the Table 1, it is possible to combine and select other 48 spreading codes. If a spreading coefficient is 128 and 48 spreading codes are selected among 128 spreading codes, it is possible transmitters are present which use different spreading codes through a same channel. If such selectable combination of spreading codes are composed as a table and this combination of a table is transmitted through a header of a packet, application about encryption are possible and problems due to multi-user are able to be solved.

Such truth table are shown in Table 2. If an input signal c11 or other input signal c12 has logical high, spreading code groups WG1, WG2 inputted to the phase shifters 16, 18 is reversed to be produced. Another input signal c13 are used as the control signal so that the multiplexer 20 receives two kinds of spreading codes produced from the phase shifters 16, 18 and creates one symbol. The two kinds of spreading codes inputted to the multiplexer 20 have orthogonality between the two kinds of spreading codes. Even if a half of total length of the spreading codes are used, such orthogonality can be remained.

TABLE 2

| Input Data | | | S1 | |
|---|---|---|---|---|
| c11 | c12 | c13 | Symbol Group | Walsh Code |
| 0 | 0 | 0 | SG1a SG2b | WG1a WG2b |
| 1 | 0 | 0 | SG1a SG2b | $\overline{WG1a}$ WG2b |
| 0 | 1 | 0 | SG1a SG2b | WG1a $\overline{WG2b}$ |
| 1 | 1 | 0 | SG1a SG2b | $\overline{WG1a}$ $\overline{WG2b}$ |
| 0 | 0 | 1 | SG2a SG1b | WG2a WG1b |
| 1 | 0 | 1 | SG2a SG1b | WG2a $\overline{WG1b}$ |
| 0 | 1 | 1 | SG2a SG1b | $\overline{WG2a}$ WG1b |
| 1 | 1 | 1 | SG2a SG1b | $\overline{WG2a}$ $\overline{WG1b}$ |

In table 2, a lower suffix 'a' and other lower suffix 'b' mean order of codes alignment. The spreading codes WG1~WG8 or symbols SG1~SG8 including a lower suffix 'a' mean that the codes or symbols are arranged in front portion of added spreading codes. While, the spreading codes WG1~WG8 or symbols SG1~SG8 including a lower suffix 'b' mean that the codes or symbols are arranged in backward portion of added spreading codes.

Furthermore, Since even if it is in state phase is reversed, orthogonality can be remained, spreading codes can be derived from a receiver received the spreading codes which are modulated in phase at a phase modulating device. That is, if phase is reversed and half of two spreading code groups are combined each other, spreading codes as one symbol are created.

As above description, one symbol are created using half of two respective spreading code groups. At this time, the input signal c13 inputted to the multiplexer 20 from the serial-to-parallel converters 4 are used as the control signal by which any spreading codes between two spreading codes SG1, SG2 are arranged at front side.

While, a portion which are not described in the Table 1 and Table 2 is explained using an example. If all of the input signals b11, b12, b13 are 0, the input signals b11, b12, b13 are mapped to W00 and if c11 is 0, SG1 become a Walsh code 0. If all of the input signals b14, b15, b16 are 0, the input signals b14, b15, b16 are mapped to W08, if c12 is 0, SG2 become a Walsh code 8. If c13 is 0, first range 1~31 between two ranges constituting the symbol S1 comprises SG1 and second range 33~64 comprises SG1. The multiplexer 20 receives from the phase shifters 16, 18 the symbols SG1, SG2 of which order is aligned. Then, the symbols are multiplexed in the multiplexer 20, which produces a multiplexed symbol S1 serially toward the majority bit selector 70.

Table 3 shows composition of symbol S1 produced from the multiplexer 20 by code selection operation controlled by control signals c11~c13. Two chips or two codes which comprises 64 chips are divided with half respectively and make the symbol S1. Therefore, the symbol S1 as an output signal become to have same length as an spreading code inputted to the serial-to-parallel converters 4.

TABLE 3

| Symbol | W00a WO8b | | | | | | | | | | | | |
|---|---|---|---|---|---|---|---|---|---|---|---|---|---|
| code number | W00a | | | | | | WO8b | | | | | | |
| code sequency code | 1 | 2 | 3 | ... | 30 | 31 | 32 | 33 | 34 | 35 | ... | 62 | 63 | 64 |

As described in upper side of FIG. 2, if an input signal IN1 has bit transmission rate of 9 Mbps, 9 bits are mapped to one symbol through the serial-to-parallel converters 4 and symbol transmission rate at this time are lowered to 1 Msps. Next, the symbol are passed though the spreaders 12, 14 to create the spreading codes (W00, W01, W02, W03, W04, W05, W06, W07), (W08, W09, W10, W11, W12, W13, W14, W15), which are inputted to the phase shifter 16, 18.

Then, symbols SG1, SG2 are passed through phase modulating process and order aligning process at the phase shifter 16, 18 by the control signals c11, c12 produced separately from the serial-to-parallel converter 4 and then, they are inputted to the multiplexer 20. During the symbols SG1, SG2 are passed through the multiplexer 20, length of the spreading codes do not change. Therefore, transmission rate of chips do not change. Then, the symbol S1 which are produced from the multiplexer 20 through this process has an transmission rate of 64 Mcps. Therefore, if 64 MHz clock are used, expression of one chip is possible with a period of clock and it is possible to transmit maximum 9 Mbps as the input signal on a channel as described in FIG. 2.

Then the majority selector 70 receives multiplexed symbols S1, S2, S3 from the multiplexer 20, 40, 60 of the channel 1 10, channel 2 30 and channel 3 50, and produces an output OUT according to a truth table of Table 4. In this case, if a input signal IN with transmission rate of 9 Mbps is inputted to the serial-to-parallel converters 4, 6, 8, symbols SG1, SG2, SG3, SG4, SG5, SG6 produced from the phase shifter 16, 18, 36, 38, 56, 58, other symbols S1, S2, S3 produced from the multiplexers 20, 40, 60 and the symbol OUT produced from the majority selector 70 have all of same as speed of 64 Mcps.

TABLE 4

| Input chip | | | |
|---|---|---|---|
| S1 | S2 | S3 | OUT |
| 0 | 0 | 0 | 0 |
| 1 | 0 | 0 | 0 |
| 0 | 1 | 0 | 0 |
| 1 | 1 | 0 | 1 |
| 0 | 0 | 1 | 0 |

TABLE 4-continued

| Input chip | | | |
|---|---|---|---|
| S1 | S2 | S3 | OUT |
| 1 | 0 | 1 | 1 |
| 0 | 1 | 1 | 1 |
| 1 | 1 | 1 | 1 |

While, in second embodiment of the present invention, if 64 MHz as system clock frequency which is same as above first embodiment of the present invention is used, transmission rate of 27 Mbps can be performed. If a clock of 128 MHz as system clock frequency is used, transmission rate of maximum 54 Mbps can be performed. Therefore changeability is possible about clock frequency and transmission rate. For comparison, transmission rate of 9 Mbps for input data is performed when 64 MHz as system clock frequency is used, by composition of above first embodiment of the present invention.

That is, as referred in above description, since transmission speed of input data is determined by a system clock. For example, the input of 54 Mbps cannot be applied in state that the system clock is 64 MHz. Therefore, maximum transmission rate which can be transmitted is determined by the system clock. If high spreading coefficient is used, changeability is possible that furthermore spreading gain is obtained higher even if transmission rate is lowered.

Figure 3:
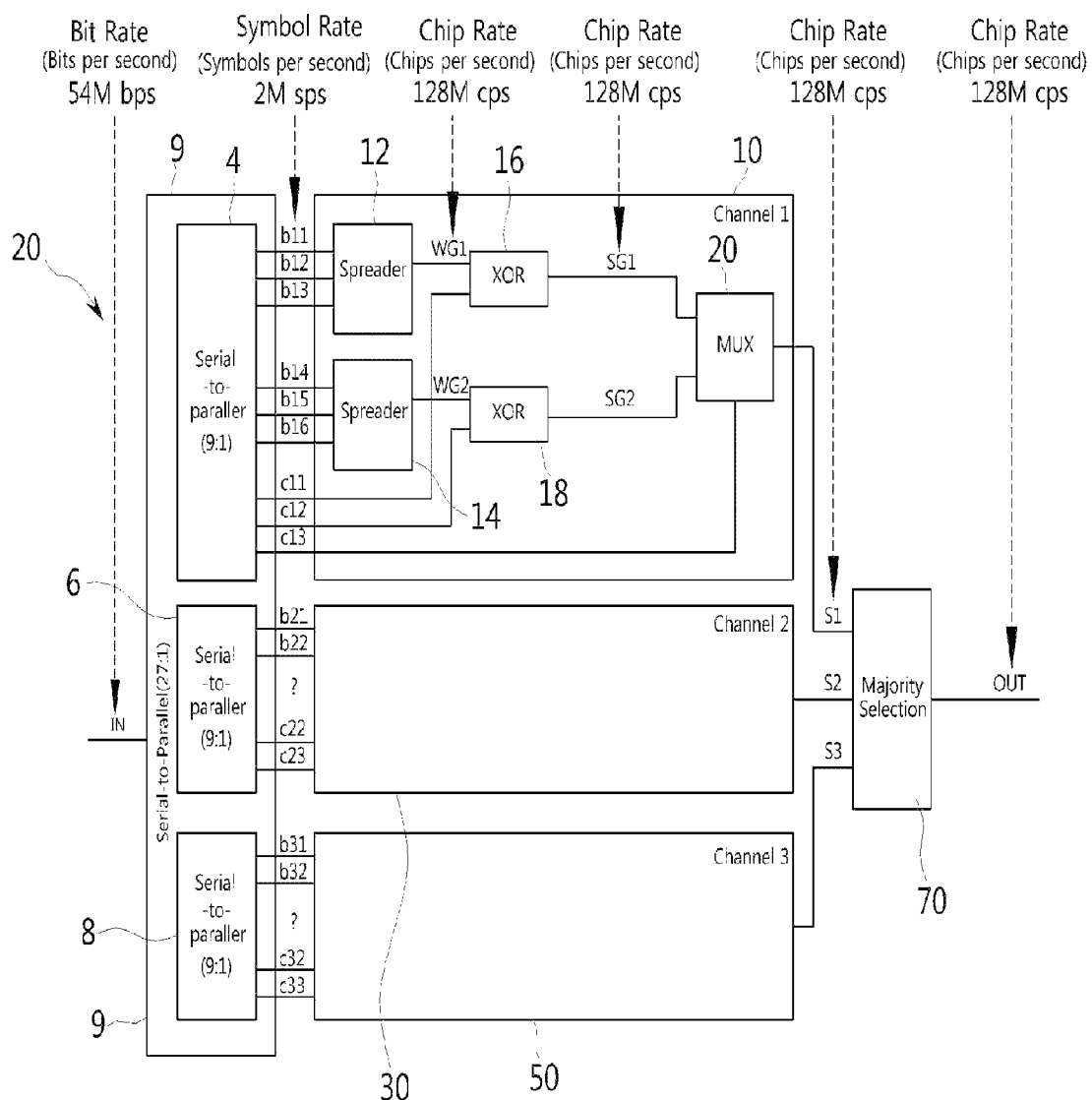
FIG. 3 is an entire block diagram of a modulator according to second embodiment of this invention in case that clock frequencies are changed.

While, as described in upper side of FIG. 3 as third embodiment of the present invention, if a the system clock inputted to serial-to-parallel converters 4, 6, 8 of the serial-to-parallel means 9 is used 128 MHz which is double of one of above first embodiment of the present invention, maximum transmission rate is raised to double and the input data of 54 Mbps is transmitted. Then transmission rate of the output signal at the majority bit selector 70 can be 128 Mcps which is double of one of above first embodiment of the present invention. As shown in this process, chip transmission rate of symbol produced from majority bit selector 70 can be adjusted according to the clock frequency of the input signal inputted to the serial-to-parallel means 9.

What is claimed is:

1. A spreading code producing apparatus comprising:
   two phase shifters for spreading code which receive bits for determining spreading codes and phase information and producing spreading codes; and
   multiplexers which receive two spreading codes produced by said two phase shifters for spreading code, receive bits through separate way and a control signal which defines outputting order of the received two spreading codes and produce spreading codes with a same length as each of said received two spreading codes;
   wherein a transmission rate of a phase modulating signal outputting from said multiplexers is proportionally increased according to increasing of clock frequencies for inputting said spreading code and said bits to said multiplexers, and
   wherein said multiplexers produce first a half of a spreading code from one of the two received spreading codes by control signals and produce later a remnant half of the spreading code from another of the two received spreading codes to generate spreading codes with a same spreading length as received ones.

2. The spreading code producing apparatus in claim 1 further comprising spreaders which produces a spreading code to said phase shifters respectively through combining received bits.

3. The spreading code producing apparatus in claim 2, wherein said spreading codes selected respectively through combining received bits have orthogonality.

4. The spreading code producing apparatus in claim 1 further comprising serial-to-parallel converters which produce:
   input signals for inputting to said spreaders so that said spreaders make said spreading codes;
   bits for inputting said phase shifters so that said phase shifters determine phase displacement of the spreading codes; and
   bits for inputting said multiplexers.

5. The spreading code producing apparatus in claim 1, wherein said phase shifter is an exclusive OR gate XOR.

6. A spreading code producing apparatus comprising:
   two phase shifters for spreading code which receive bits for determining spreading codes and phase information and producing spreading codes;
   multiplexers which receive two spreading codes produced by said two phase shifters for spreading code, receive bits through separate way and a control signal which defines outputting order of the received two spreading codes and produce spreading codes with same length as said received two spreading codes; and
   majority bit selector which receives a plurality of spreading codes produced from said plurality of multiplexers and produces a spreading code with same spreading code length as said received spreading codes;
   wherein a transmission rate of a phase modulating signal outputting from said multiplexers is proportionally increased according to increasing of clock frequencies for inputting said spreading code and said bits to said multiplexers, and
   wherein said multiplexers produce first a half of a spreading code from one of the two received spreading codes by control signals and produce later a remnant half of the spreading code from another of the two received spreading codes to generate spreading codes with same spreading length as received ones.

7. The spreading code producing apparatus in claim 6 further comprising spreaders which produces a spreading code to said phase shifters respectively through combining received bits.

8. The spreading code producing apparatus of claim 7, wherein said spreading codes selected respectively through combining received bits have orthogonality.

9. The spreading code producing apparatus in claim 6 further comprising serial-to-parallel converters which produce:
   input signals for inputting to said spreaders so that said spreaders make said spreading codes;
   bits for inputting said phase shifters so that said phase shifters determine phase displacement of the spreading codes; and
   bits for inputting said multiplexers.

10. The spreading code producing apparatus in claim 6, wherein said phase shifter is an exclusive OR gate XOR.

* * * * *